United States Patent
Dang et al.

(10) Patent No.: US 9,798,886 B2
(45) Date of Patent: Oct. 24, 2017

(54) BIO-MEDICAL SENSING PLATFORM

(71) Applicant: International Business Machines Corporation, Armonk, NY (US)

(72) Inventors: Bing Dang, Chappaqua, NY (US); John U. Knickerbocker, Yorktown Heights, NY (US); Joana Sofia Branquinho Teresa Maria, New York, NY (US); Sufi Zafar, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 14/794,399

(22) Filed: Jul. 8, 2015

(65) Prior Publication Data

US 2017/0011223 A1     Jan. 12, 2017

(51) Int. Cl.
*G06F 21/00*     (2013.01)
*G06F 21/60*     (2013.01)
*H04W 12/02*     (2009.01)

(52) U.S. Cl.
CPC .......... *G06F 21/606* (2013.01); *H04W 12/02* (2013.01)

(58) Field of Classification Search
CPC .............................. G06F 21/606; H04W 12/02
See application file for complete search history.

(56) References Cited

U.S. PATENT DOCUMENTS

| | | |
|---|---|---|
| 6,475,436 B1 | 11/2002 | Schabbach et al. |
| 6,914,279 B2 | 7/2005 | Lu et al. |

(Continued)

FOREIGN PATENT DOCUMENTS

| | | |
|---|---|---|
| CN | 102884430 A | 1/2013 |
| CN | 103412026 A | 11/2013 |

(Continued)

OTHER PUBLICATIONS

Mongra et al. Overview of Biosensors Development Around the World, International Journal of Biomedical and Advance Research, IJBAR, (2012) 03(07) www.ssjournals.com, pp. 519-530.

(Continued)

*Primary Examiner* — Mahfuzur Rahman
(74) *Attorney, Agent, or Firm* — Ryan, Mason & Lewis, LLP (57) ABSTRACT

Methods, devices, systems, and computer program products for implementing a bio-medical sensing platform are provided herein. A method includes receiving one or more items of sensed biological data and/or sensor-related information from one or more sensor devices via a communication link established with the one or more sensor devices, wherein the one or more sensor devices are associated with a given user; analyzing the one or more items of sensed biological data and/or sensor-related information to perform one or more characterization functions pertaining to the one or more items of biological data and/or the given user; and transferring the one or more items of sensed biological data and/or sensor-related information and/or a result of the one or more characterization functions to a private storage component via a communication link established with the private storage component, wherein said transferring comprises implementing one or more security functions in conjunction with said transferring.

16 Claims, 3 Drawing Sheets

(56) References Cited

U.S. PATENT DOCUMENTS

| | | |
|---|---|---|
| 6,946,197 B2 | 9/2005 | Yadav et al. |
| 7,648,677 B2 | 1/2010 | Santini, Jr. et al. |
| 7,774,038 B2 | 8/2010 | Wang et al. |
| 7,913,838 B2 | 3/2011 | Zhong |
| 8,095,197 B2 | 1/2012 | Santini, Jr. et al. |
| 8,403,907 B2 | 3/2013 | Sheppard, Jr. et al. |
| 8,442,611 B2 | 5/2013 | Santini, Jr. et al. |
| 8,604,810 B2 | 12/2013 | Sheppard, Jr. |
| 8,649,840 B2 | 2/2014 | Sheppard, Jr. et al. |
| 8,771,500 B2 | 7/2014 | Papadimitrakopoulos et al. |
| 9,314,196 B2 * | 4/2016 | Pryor .................. A61B 5/1495 |
| 2003/0114986 A1 * | 6/2003 | Padmanabhan ..... G06F 19/3493 702/1 |
| 2004/0064260 A1 * | 4/2004 | Padmanabhan ........ G08B 21/12 702/19 |
| 2005/0244811 A1 | 11/2005 | Soundarrajan et al. |
| 2006/0258929 A1 * | 11/2006 | Goode, Jr. ........... A61B 5/0031 600/345 |
| 2008/0169921 A1 | 7/2008 | Peeters |
| 2008/0221555 A1 | 9/2008 | Sheppard et al. |
| 2009/0234214 A1 | 9/2009 | Santini, Jr. et al. |
| 2012/0138458 A1 | 6/2012 | Lee et al. |
| 2013/0048496 A1 | 2/2013 | Brown et al. |
| 2013/0186755 A1 | 7/2013 | Chu et al. |
| 2014/0081665 A1 * | 3/2014 | Holmes .................. G06F 21/32 705/3 |
| 2014/0089001 A1 | 3/2014 | Macoviak et al. |
| 2014/0128278 A1 | 5/2014 | Fahmy et al. |
| 2014/0156308 A1 | 6/2014 | Ohnemus et al. |

FOREIGN PATENT DOCUMENTS

| | | |
|---|---|---|
| JP | 07209242 A | 8/1995 |
| JP | 2004003990 A | 8/2004 |
| RU | 2012130963 A | 1/2014 |

OTHER PUBLICATIONS

Wang et al. Electrochemical Sensors for Clinic Analysis, Sensors 2008, 8, 2043-2018, ISSN 1424-8220 www.mdpi.org/sensors.

* cited by examiner

BIO-MEDICAL SENSING PLATFORM

FIELD

The present application generally relates to information technology, and, more particularly, to diagnostic techniques.

BACKGROUND

It is desirable and/or preferable that healthcare diagnostics be timely and secure to provide an opportunity to be impactful with actionable benefits across a wide range of health risks to aide quality of life and reduce costs and/or treatments.

SUMMARY

In one aspect of the present invention, techniques for implementing a bio-medical sensing platform are provided. An exemplary computer-implemented method can include steps of receiving one or more items of sensed biological data and/or sensor-related information from one or more sensor devices via a communication link established with the one or more sensor devices, wherein the one or more sensor devices are associated with a given user; analyzing the one or more items of sensed biological data and/or sensor-related information to perform one or more characterization functions pertaining to the one or more items of biological data and/or the given user; and transferring the one or more items of sensed biological data and/or sensor-related information and/or a result of the one or more characterization functions to a private storage component via a communication link established with the private storage component, wherein said transferring comprises implementing one or more security functions in conjunction with said transferring.

In another aspect of the invention, an exemplary system can include one or more sensor devices comprising at least (i) a processor, (ii) a memory, (iii) a sensing mechanism, (iv) an energy source, and (v) a communication mechanism; an integration device comprising at least (i) a processor (ii) a memory, and (iii) a communication mechanism; and a private storage component. In such an exemplary system, the one or more sensor devices capture, in accordance with one or more instructions provided by the integration device, one or more items of biological data and/or sensor-related information associated with a given user and transfer said one or more items of biological data and/or sensor-related information to the integration device via a link established between the communication mechanism of the one or more sensor devices and the communication mechanism of the integration device. Additionally, in such an exemplary system, the integration device analyzes the one or more items of biological data and/or sensor-related information via the processor of the integration device and transfers the one or more items of biological data and/or sensor-related information to the private storage component via the communication mechanism of the integration device.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes a bio-medical sensing platform. At least one embodiment of the invention includes a microsystem with an electrically controlled opening of cavities or sealed structures for sensing and analysis. As detailed herein, the cavities serve as a housing for sensors. In at least one embodiment of the invention, sensing devices are fabricated inside of cavities, and the cavities are subsequently sealed. Also, the cavities or sealed structures can house one or more sensors per cavity or sealed structure, and the system or sensor can therefore include many such cavities or sealed structures, wherein each can have one or more sensors which can be individually opened so as to permit new sensor readings and/or data output.

Reasons for opening or accessing new sensors can include, for example but not limited to, a timed new sensor reading output, an on-demand sensor reading, a continuation of a sensor reading following a failure of a prior sensor reading, a comparison of new sensor data with a prior sensor reading from the same sensor or from an alternate sensor reading, calibration of a sensor, etc. Note that a sensor can be placed in a cavity that is sealed or can be placed in or on a surface that is sealed from reaction or sensing from the targeted sensing medium (such as liquid, vapor and/or solid) until desired, by opening the seal. Also, at least one embodiment of the invention includes implementing a membrane that is opened electrically, thereby rendering analyte in instant contact with a sensor. Such sensor interaction is programmable to generate instant and/or periodic opening of the membrane.

Sensors to be implemented in connection with one or more embodiments of the invention can include, for example, a skin patch, a breath analyzer component, a tear fluid analyzer component, a sweat sensor, and/or a (swallowed or otherwise ingested) pill sensor. A platform in accordance with one or more embodiments of the invention can include linking sensor data to cloud analytics and/or smart device analytics in addition to base sensor analytics and cognitive feedback, actionable options advisors and/or a recommendations component. As also detailed herein, at least one embodiment of the invention includes one or more controlled openings for cavities, each with an internal vacuum or a partial vacuum, and membrane opening/pore size option control to sample biological information for analysis and/or sensing that can be timed to open and seal the opening per a set of preferences and/or instructions. A vacuum/partial vacuum aids in protecting sensors from contamination prior to activation, and a vacuum/partial vacuum can also provide a pressure difference from ambient to facilitate a controlled release upon activation. In addition, a vacuum/partial vacuum and/or a surface that provides a desired sensing surface can permit a desired medium to engage the sensor and the sensor to provide a response or streaming response of data over time.

Further, a platform in accordance with one or more embodiments of the invention can be linked to one or more personal security mechanisms. Such personal security mechanisms can include, for example, biometrics such as a fingerprint and/or deoxyribonucleic acid (DNA) decoding, one or more unique identifiers such as a unique identification tag built into a sensor which needs to be wirelessly engaged and receive authorization from the connecting communication device/link to proceed. In such an example embodiment, the connecting communication device/link can also utilize encryption to protect the data during transfer and utilize one or more methods for security verification from biometric data. Such methods can include utilizing new random number security codes ahead of data communication, utilizing combinations of secure hardware, software, bio-markers and/or biometric data with appropriate wired or wireless (such as radio frequency (RF), light and/or sound transmission) secure link verification, or handshake authorization for the encrypted (or non-encrypted, if appropriate for that sensor information) data to be transmitted.

Additionally, at least one embodiment of the invention includes implementing sealed structures with a control fluid of one or more known concentrations (for example, one or more targeted bio sensing concentrations of interest) for control reference in a sensing device. Also, one or more embodiments of the invention can include incorporating an ability to store information obtained from each sensing device and each control and/or reference sensing device.

Further, at least one embodiment of the invention can also include capturing sensor calibration wear-out, using mechanical pressure in addition to electrical, optical and magnetic sensing characterization, using time-stamps on sensor data tracking as well as location, temperature, etc. to record not only sensor information related to biometric data but also time, location, and other potentially relevant information.

Figure 1:
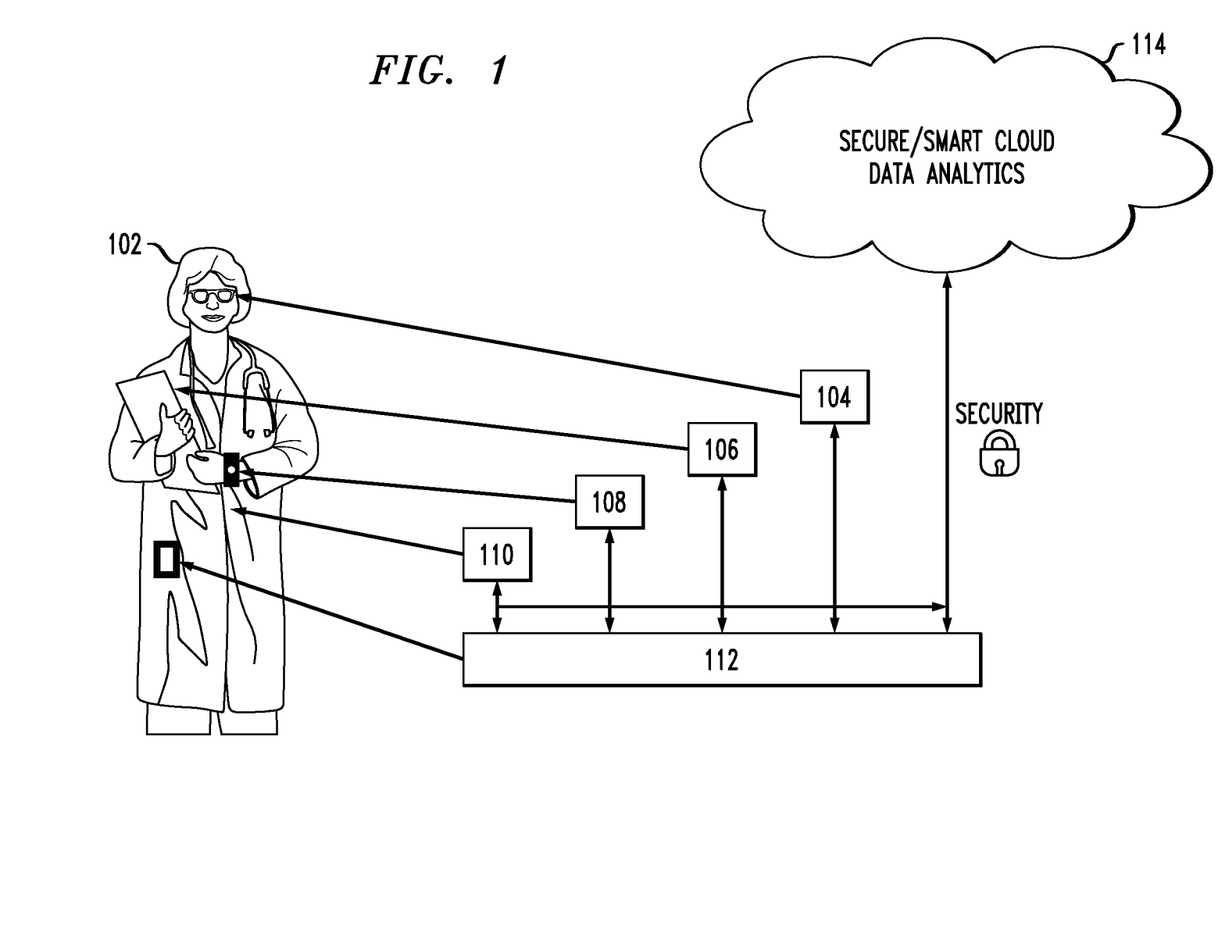
FIG. 1 is a diagram illustrating system architecture, according to an example embodiment of the invention.

FIG. 1 is a diagram illustrating system architecture, according to an embodiment of the invention. By way of illustration, FIG. 1 depicts a characterization platform that includes various sensors and/or smart devices (104, 106, 108, 110 and 112) implemented and/or worn by a user 102 and linked to a secure and smart cloud 114 with data analytics capabilities. As depicted, sensors and/or smart devices implemented and/or worn by user 102 can include smart glasses and/or contact lenses 104, an information awareness tablet 106, a skin contact watch and/or patch smart sensors 108, an internal smart pill sensor, and a smart device 112 that encompasses a computation and network communication platform.

As also illustrated in FIG. 1, the smart glasses and/or contact lenses 104, the information awareness tablet 106, the skin contact watch and/or patch smart sensors 108, and the internal smart pill sensor form communicative (for example, wireless) links with the smart device 112. Additionally, the smart device 112 forms a communicative (for example, wireless) link with the cloud 114, wherein one or more security features (as detailed herein) can be implemented in connection with this link.

As detailed herein, an example embodiment of the invention such as depicted in FIG. 1 can be in situ, portable, and/or on-demand. For example, the smart device 112 can include a hardware base platform and/or a smart sensor. Such a device (112) can include two-way wireless links to local personal sensors (such as 104, 108 and 110) for data storage and processing, a two-way wireless link to a local tablet (such as 106), and a two-way wireless link to the cloud (114) and a cognitive computation component (for example, an awareness and smart options advisor) embodied therein. Also, the smart device 112 can include a software base application platform which collects data from sensors (such as 104, 106, 108, 110), a person (such as 102), as well as local and/or cloud analysis (such as via 114).

As used herein, incorporation of an awareness and smart options advisor can include the following example implementations. The sensor(s) may be providing human and/or pet-related information about the human and/or pet. For a human, the information can be transmitted back to the same person and/or to another individual. In such an example, assume that multi-axis motion sensors, temperature sensors and other bio-metric personal data are being used by a human who lives alone. The sensors, when combined into trending data and analysis, provide awareness of the data and serve as a smart options advisor to both the human and to a designated family member, friend and/or caregiver. Information can be provided, such as, for example, if the human, based on time of day, rate of movement from being vertical and moving to laying down or sitting, may have an elevated temperature and/or may need rest due to being sick with an elevated temperature and/or based on other biometric data. Such information might also suggest that the human has fallen based on rapid movement of the multi-axis sensors followed by no movement other than breathing and/or other bio-metric data, therefore prompting a need for assistance.

Similarly, sensor readings such as glucose sensor readings may lead to and/or suggest a need for action by the human or another person. Also similarly, sensor readings on pulse rate or combinations of pulse, breathing, blood flow, neuromorphic status and/or motion may alert a human or healthcare provider of a person having a pre-heart attack or stroke. Other awareness and/or smart options can include, for example, sports tracking, medical condition, health, wellness and disease prevention and/or surgical recovery. Such options can be achieved with sensors and a smart options advisor based on individual information and relative background trending, in connection with actionable sensing information that can be preset or determined based on biometric data, comparison data, reference data for that individual, reference data of a desired small group (such as relevant family members history), targeted relevant large data sets of information from large data analytics, DNA or other bio-markers, and/or a combination of data sets that can be considered important reference information for the individual (a targeted personalized care group related to a specific personal targeted disease or problem, for example).

Further, in at least one embodiment of the invention, a device such as smart device 112 can also include data and reference computation and communication capabilities for use, for example, by an awareness and smart options advisor, and/or to determine personal or patient trending data references. Trending data may include, for example, data for an individual over time during periods of rest (sitting or sleeping), periods of exercise, and/or during periods of stress. During such times, the sensor data may show normal biometric data trending when sleeping, during normal work and/or physical exertion, but may show extremes of pulse, breathing, blood pressure or any multitude of one or more trending data that may place that individual at a much higher risk of impacting their health and wellness. Similarly, data taken and trending for an individual during surgery and during recovery may indicate that the person may have recovered at a better rate than the normal population and can leave a hospital early, or may indicate that additional time is needed prior to departure to help reduce risk to the person.

Figure 2:
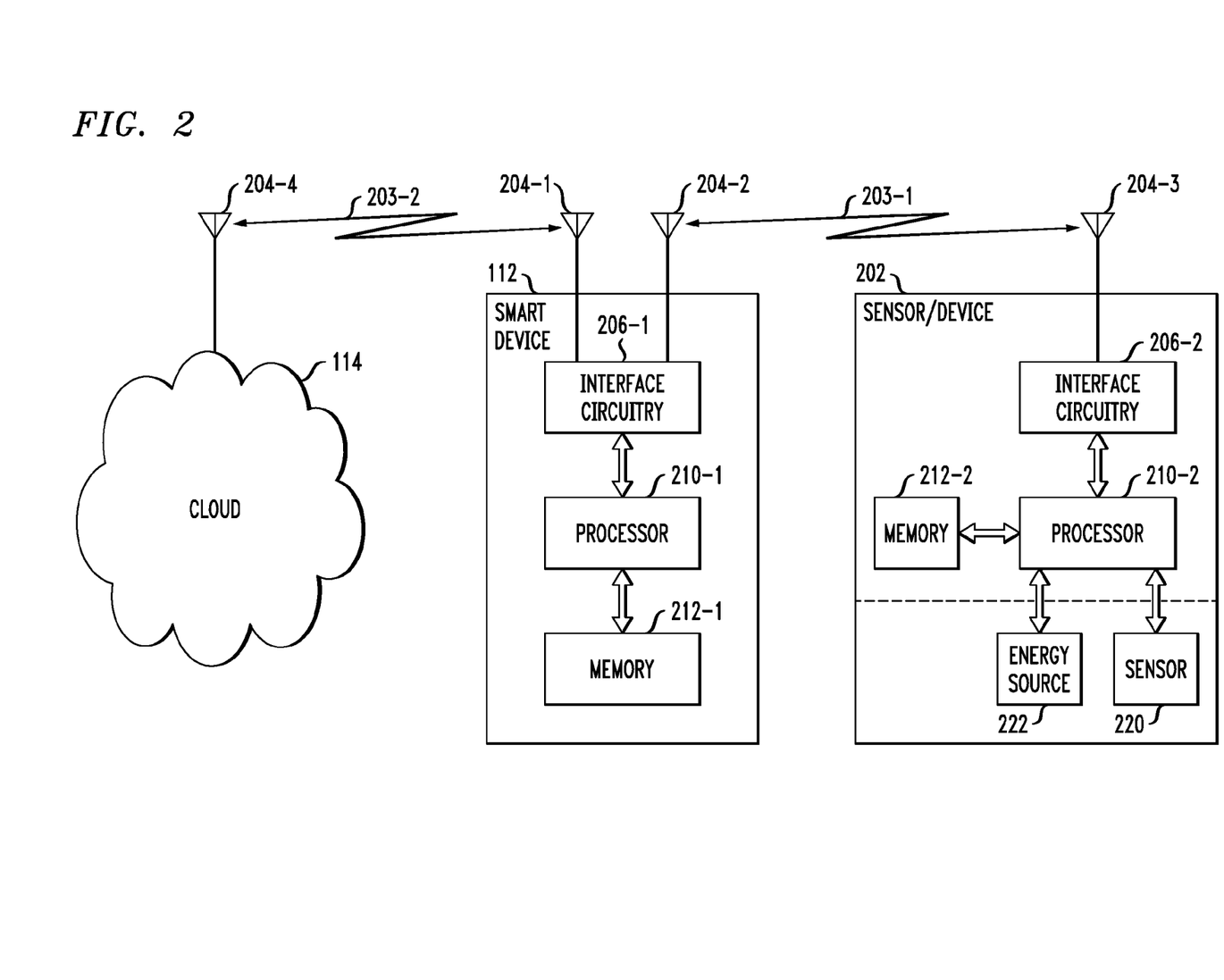
FIG. 2 is a diagram illustrating system architecture, according to an example embodiment of the invention.

FIG. 2 is a diagram illustrating system architecture, according to an example embodiment of the invention. By way of illustration, FIG. 2 depicts, in conjunction with FIG. 1, an exemplary system corresponding generally to an implementation of a system which comprises smart device 112 (which can also be a local smart or cognitive system or a local smart advisor), a sensor or alternate device 202, and the cloud 114 (for example, a personal cloud or a remote cognitive computing advisor which is capable of supporting and/or referencing much larger data references and running much larger data analytics relative to the local smart device, local cognitive system or local smart advisor).

In this embodiment, device 112 and sensor/device 202 communicate with one another over a wireless channel 203-1 using respective antennas 204-2 and 204-3 and respective interface circuitry 206-1 and 206-2. Similarly, the smart device 112 and the cloud 114 communicate with one another over a wireless channel 203-2 using respective antennas 204-1 and 204-4. Each of smart device 112 and sensor device 202 further comprises a processor 210 coupled to a memory 212 (210-1 and 212-1, and 210-2 and 212-2, respectively).

In at least one example embodiment of the invention, the smart device 112 may represent a portable device, such as a mobile telephone, a personal digital assistant (PDA), a wireless email device, a tablet, a game console, etc., and may alternatively represent a desktop or laptop personal computer (PC), a microcomputer, a workstation, a mainframe computer, a wired telephone, a television set top box, or any other information processing device which can benefit from the use of the techniques encompassed in accordance with one or more embodiments of the invention. Additionally, in at least one example embodiment of the invention, the sensor/device may represent a portable device, such as a mobile telephone, a PDA, a tablet, a wireless email device, etc., and may also represent one of a multitude of sensors (such as depicted in FIG. 1, for example). Accordingly, in the one or more embodiments of the invention implementing a sensor, the sensor/device 202 components includes a sensor 220 and an energy source 222 coupled to the processor 210-2. As detailed herein, example sensor/device 202 implementations can include a pill, a patch, a contact lens, wearable clothes with targeted biometric sensors, socks, shoes, sneakers or other foot wear, a watch, a sub-skin sensor, implant and/or surgical implant, etc.

Accordingly, as described herein, one or more embodiments of the invention include implementing a smart platform that provides for integration of hardware, software and analysis of electronic information and/or data from and to a person with an electronic component and/or device by way of communication within the smart platform and/or between the smart platform and one or more other electronic platforms, communication platforms, computing platforms, cloud platforms, network platforms, cognitive platforms, secure platforms, medical platforms, and/or business platforms by way of an electronic, an optical, a wireless, and/or a wired interconnection.

Within such an embodiment of the invention, smart sensors and/or on-person platform components (such as 104, 108 and 110, as depicted in FIG. 1) can include one- or two-way communication between the smart sensors/on-person components which also include a sensing element, a processor for local data analysis, a control of data for storage (such as a memory), analysis, and communication. Such control can include determination and/or manipulation of the timing of communication, the type of communication to be sent and received, the means of communication (such as wireless, for example), the incorporation of one or more security and/or encryption features, the identification of a sensor user, a smart tag identification with data and/or encryption, the timing of sensing, power management, the address and authorization of a secure receiver of data, as well as user(s) and/or access authorization for data.

At least one embodiment of the invention additionally includes incorporating the capability to transfer data to one or more smart integration devices (such as 112, as depicted in FIG. 1) from and/or to one or more standard or smart sensors (such as 104, 108 and 110) wherein each smart integration device can act to review electronic and/or optical data from one or more local sensors and act to analyze and compare the sensor data relative to personal reference data. The integration device can additionally provide instructions on the sensor data such as a given lower and upper reference range of data against any one or more types of data being collected. Such data can include, for example, heart rate, temperature, glucose level, blood pressure, oxygen level, ion level(s), $CO_2$ level, $N_2$ level, alcohol level, disease level, radiation level, acceleration level, position (standing/vertical or laying down/horizontal), stress level, or other sensing or diagnostic data. Similarly, examples of sensors can include, for instance, a glucose sensor, a urea sensor, an ion sensor (Cl, Na, Mg, Ca), an $O_2$ sensor, a disease sensor, a cancer sensor, a protein sensor, a deoxyribonucleic acid (DNA) sensor, etc.

At least one embodiment of the invention additionally includes incorporating the capability to transfer data to one or more smart integration devices (such as 112, as depicted in FIG. 1) from and/or to one or more standard or custom electronic components (such as 106) that the user may utilize for potential communication with another person, computing device or cognitive computing device that may provide a response with information to the initiator or another party associated with the initiator. Such transferred data can be, for example, derived from one or more sensors (such as 104, 108 and/or 110) or input electronic data. Additional data transfers can include, for example, transferring data from a smart integration device and/or one or more sensors into a reference mode for trending analysis as well as for determining actionable limits from a user, a medical professional, and/or a cognitive computer guidance system or alternate source guidance system.

Additionally, at least one embodiment of the invention can include verifying electronic and/or optical data derived from the one or more sensors, analytical platforms and/or secure component smart platforms. Such verification can be applied to communications, transmissions, storage actions, processing actions and/or authorization actions. Further, such verification can include, for example, encryption techniques, and can be implemented in connection with user DNA, a bio-secure chip, a password, personal bio-genetic or bio-reference data and/or other security means.

Also, one or more embodiments of the invention can include implementing local storage of sensed/analyzed data, multi-device or platform storage of sensed/analyzed data and/or remote storage of sensed/analyzed data. Further, as detailed herein, at least one embodiment of the invention can additionally include controlling the timing of multiple actions including data measurement, data storage, data transfers, local data analysis, platform analysis, multi-component comparison, remote comparison to personal or reference data, response and actionable messaging to a user and/or a user-designated person or system, etc. Further, in one or more embodiments of the invention, data analytics can be carried out by a sensor, a smart platform, a communication platform, a local and/or remote analysis and action component. Such data analytics can be supplemented by, for example, feedback or recommendations provided by a user or external source such as an advisor and/or verification system that can utilize knowledge relative to personal trending data, knowledgeable relative to a larger database of other individuals that may be of a defined parametric (such as, for example, a similar genetic disposition).

As detailed herein, at least one embodiment of the invention includes implementing controlled access to the electronics and interconnections as well to one or more sensors with use of a protective temporary seal comprising a mechanism that permits opening the seal using a low-energy mechanism such as with a stressed membrane, electronic activation, or conversion of the seal material (such as SiN, $SiO_2$, metal, Al, stressed membrane, etc.) that can be opened on demand or based on an electronic timed opening directing when access to a sensor and/or calibration of a sensor is to be carried out. In one or more embodiments of the invention, sensors such as a glucose sensor, require dry storage for a long shelf-life. Such a sensor can, for example, be held dry for a significant period of time and then opened on demand or per a predetermined schedule for sensor readings. Such readings can include, for example, $HfO_2$ nanowire sensing with surface treatments for reading and interaction with fluids. Examples of measurement fluids can include blood, sweat, tears, saliva, mucus or other body fluid.

Further, in one or more embodiments of the invention, certain sensors can require in situ calibration. Such embodiments can include incorporating and/or using a reference fluid of known concentration for calibration purposes. Targeted reference solutions can include, for example, glucose. Further, ions or some other measurement target can be held in a sealed reference area to be exposed to the given sensor on demand and compared to target fluids for measurement. Example measurement fluids can include blood, sweat, tears, saliva, mucus or other body fluid.

Additionally, at least one embodiment of the invention includes incorporating and/or implementing one or more sensors for one or more targeted diagnostic capabilities. For example, an array of biosensors such as bipolar junction transistor (BJT) sensors with extended base sensing surfaces can be used for performing diagnostics of multiple analytes from the same fluid (for example, sweat). In such an example embodiment, the sensing surface of each sensor device would be functionalized differently or of different material. For example, a TiN sensing surface can detect pH, an AgCl surface can detect chloride ion, a TiN surface coated with oxidase can detect glucose, and a gold surface coated with antibodies can detect one or more specific proteins.

At least one or more embodiments of the invention can additionally include incorporating and/or implementing one or more pharmaceutical compound delivery techniques in connection with one or more cavities. Such pharmaceutical compound delivery can be utilized to compliment sensing data if needed to treat one or more issues such as, for example, a vital signs issue, a glucose level issue, a blood pressure issue, etc. Such an embodiment of the invention can further include sensing for the pharmaceutical compound release post-delivery and using reference data and measured values over time to determine whether the pharmaceutical compound was successfully delivered and the effectiveness or trend of given biometric data due to the pharmaceutical compound delivery. Such trending data can be compared to the individual's personal history under similar conditions to determine whether effects are normal or abnormal beyond preset targets. Based on such information, actionable follow-up measures can also be recommended for the individual to maintain wellness.

Also, at least one embodiment of the invention includes utilizing analytics to identify the onset of a sensor failure (which may potentially cause the corresponding sensor data to have inaccuracies). For instance, in electrochemical label-free biosensors (such as, for example, field-effect transistor (FET) based sensors, bipolar transistor based sensors, and metal oxide semiconductor (MOS) capacitor sensors), the onset of sensor failure can be marked by significant increase in noise and drift of the sensing signal. Accordingly, monitoring such parameters will flag the onset of sensor failure of these types of sensors.

Further, one or more embodiments of the invention include using two (or more) sensing methods for measuring the same analyte from the same fluid to reduce false positive and calibration related errors. Such analytics compare results, and the results would only be accepted if the sensing results from the both methods are in agreement and/or consistent. Additionally, at least one embodiment of the invention can include implementing a common reference electrode for all electronic sensors (such as FET sensors and BJT sensors) in a single cavity. By way of example, the reference electrode can include a glass capillary with an AgCl/Ag wire immersed in a high concentration KCl solution and an $H_2O$ porous plug. Such a reference electrode can also include a metal wire in contact with the solution under study in a given implementation.

Figure 3:
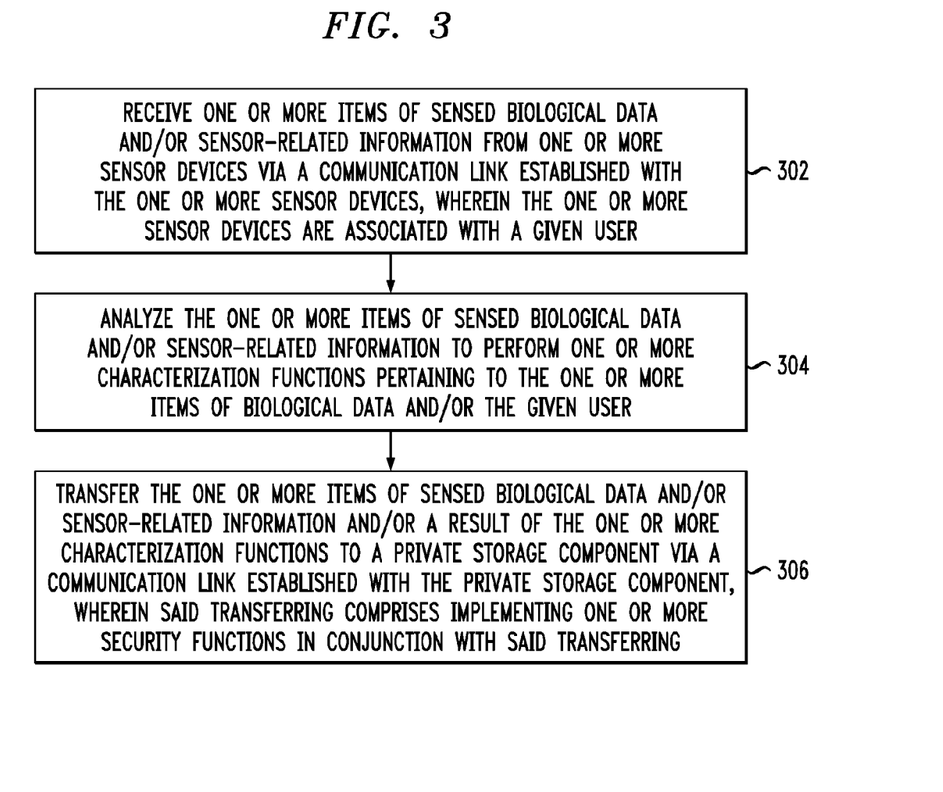
FIG. 3 is a flow diagram illustrating techniques according to an embodiment of the invention.

FIG. 3 is a flow diagram illustrating techniques according to an embodiment of the present invention. Step 302 includes receiving one or more items of sensed biological data and/or sensor-related information from one or more sensor devices via a communication link established with the one or more sensor devices, wherein the one or more sensor devices are associated with a given user. The items of sensed biological data and/or sensor-related information can include, for example, heart rate data, temperature data, glucose level data, blood pressure data, oxygen level data, ion level data, carbon dioxide level data, nitrogen gas level data, alcohol level data, disease level data, radiation level data, and/or stress level data. Also, the sensor device can include at least one of an electrical sensor, a magnetic sensor, and an optical sensor.

In one or more embodiments of the invention, the communication link established with the one or more sensor devices can include a wireless communication link and/or a wired communication link.

Step 304 includes analyzing the one or more items of sensed biological data and/or sensor-related information to perform one or more characterization functions pertaining to the one or more items of biological data and/or the given user. Analyzing can include, for example, comparing the one or more items of sensed biological data and/or sensor-related information to one or more items of reference data.

Step 306 includes transferring the one or more items of sensed biological data and/or sensor-related information and/or a result of the one or more characterization functions to a private storage component via a communication link established with the private storage component, wherein said transferring comprises implementing one or more security functions in conjunction with said transferring. The private storage component is associated with the given user such as, for example, a private cloud. Additionally, the communication link established with the private storage component can include a wireless communication link.

The techniques depicted in FIG. 3 can also include providing a set of one or more instructions to the one or more sensor devices, wherein the set of one or more instructions can include, for example, specification of a given lower bound and a given upper bound for a given type of sensed data. Additionally, at least one embodiment of the invention includes transferring the one or more items of sensed biological data and/or sensor-related information and/or the result of the one or more characterization functions to a third-party system for guidance pertaining to an action to be taken in response to the one or more items of sensed biological data and/or the result of the one or more characterization functions. Further, the techniques depicted in FIG. 3 can additionally include verifying the one or more items of sensed biological data and/or sensor-related information received from the one or more sensor devices.

Additionally, the techniques depicted in FIG. 3 can include controlling timing of (i) said receiving, (ii) said analyzing, and/or (iii) said transferring. Controlling timing can include activating the one or more sensor devices on demand and/or activating the one or more sensor devices according to a timed schedule. Also, the techniques depicted in FIG. 3 can include implementing one or more analytics to identify the onset of a failure of the one or more sensor devices. For example, in electrochemical label free biosensors (for instance, field-effect transistor (FET) based sensors, bipolar transistor based sensors, and/or metal oxide semiconductor (MOS) capacitor sensors), the onset of sensor failure can be marked by a significant increase in noise and drift of the sensing signal. Hence, monitoring these two parameters can assist in identifying the onset of sensor failure.

The techniques depicted in FIG. 3 can additionally include implementing at least two sensing methods in connection with the one or more sensor devices for measuring a common analyte from a common fluid to identify a sensor-related error. In such an embodiment of the invention, analytics can be implemented to compare the results of the at least two sensing methods, and the results would only be accepted if the sensing results from all methods are in agreement.

Further, the techniques depicted in FIG. 3 can also include implementing a common reference electrode for each respective one of the one or more sensor devices in a single cavity. The reference electrode can include, for example, a glass capillary with an AgCl/Ag wire immersed in a high concentration of KCl and wherein the bottom of the capillary has an $H_2O$ porous plug. The reference electrode can also include, for example, a metal wire in contact with a given solution under study.

Further, one or more embodiments of the invention include an exemplary system that includes one or more sensor devices comprising at least (i) a processor, (ii) a memory, (iii) a sensing mechanism, (iv) an energy source, and (v) a communication mechanism; an integration device comprising at least (i) a processor (ii) a memory, and (iii) a communication mechanism; and a private storage component. In such an exemplary system, the one or more sensor devices (i) capture, in accordance with one or more instructions provided by the integration device, one or more items of biological data and/or sensor-related information associated with a given user and (ii) transfer said one or more items of biological data and/or sensor-related information to the integration device via a link established between the communication mechanism of the one or more sensor devices and the communication mechanism of the integration device. Additionally, in such an exemplary system, the integration device (i) analyzes the one or more items of biological data and/or sensor-related information via the processor of the integration device and (ii) transfers the one or more items of biological data and/or sensor-related information to the private storage component via the communication mechanism of the integration device.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
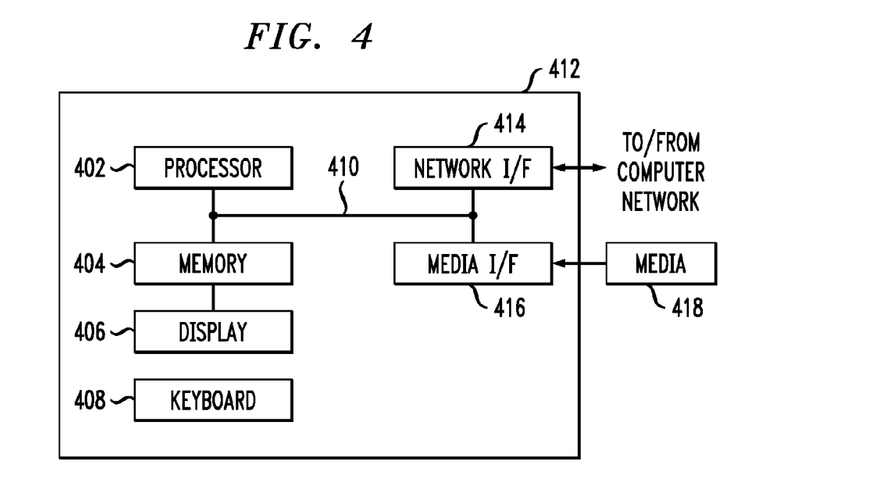
FIG. 4 is a system diagram of an exemplary computer system on which at least one embodiment of the invention can be implemented.

Additionally, an aspect of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity). In addition, in one or more embodiments of the invention, information can also be transmitted from the smart sensors and/or local smart devices to a user by way of other human senses, such as sound or voice transmission, directly from the sensor and/or smart device or transmitted to an electronic hearing device or aide, by way of vibration, light/optics, touch and/or combinations thereof, or alternate mechanisms of communication to a user and/or designated recipient(s) directly via wired, wireless and/or wearable or implantable devices.

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), non-volatile memory, phase change memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, field programmable gate arrays (FPGAs), EPROMs, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one aspect of the present invention may provide a beneficial effect such as, for example, creating a smart platform that provides for integration of hardware, software and analysis of electronic information or data from and to a person with an electronic component or device by means of communication within the smart platform.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

activating one or more sensor devices according to a timed schedule;

receiving one or more items of sensed biological data and one or more items of sensor-related information from the one or more sensor devices via a communication link established with the one or more sensor devices, wherein the one or more sensor devices are associated with a given user, wherein the communication link established with the one or more sensor devices comprises one of a wireless network communication link and a wired network communication link, and wherein the one or more items of sensor-related information comprise (i) a time-stamp attributed to each of the items of sensed biological data, (ii) a sensor location identifier attributed to each of the items of sensed biological data, and (iii) a temperature value measured in conjunction with each of the items of sensed biological data;

creating a security mechanism linking the one or more sensor devices with a private storage component associated with the given user, wherein the security mechanism is based on the one or more items of sensor-related information;

analyzing the one or more items of sensed biological data to perform one or more characterization functions pertaining to the one or more items of biological data and the given user; and transferring, upon compliance with the security mechanism, the one or more items of sensed biological data and a result of the one or more characterization functions to a private storage component via a communication link established with the private storage component, wherein the communication link established with the private storage component comprises one of a wireless network communication link and a wired network communication link, and wherein said transferring comprises implementing one or more security functions in conjunction with said transferring.

2. The method of claim 1, wherein said analyzing comprises comparing the one or more items of sensed biological data to one or more items of reference data.

3. The method of claim 1, comprising:
providing a set of one or more instructions to the one or more sensor devices.

4. The method of claim 3, wherein the set of one or more instructions comprises specification of a given lower bound and a given upper bound for a given type of sensed data.

5. The method of claim 1, wherein the one or more items of sensed biological data comprise heart rate data, temperature data, glucose level data, blood pressure data, oxygen level data, ion level data, carbon dioxide level data, nitrogen gas level data, alcohol level data, disease level data, radiation level data, and stress level data.

6. The method of claim 1, comprising:
transferring the one or more items of sensed biological data and a result of the one or more characterization functions to a third-party system for guidance pertaining to an action to be taken in response to the one or more items of sensed biological data and the result of the one or more characterization functions.

7. The method of claim 1, comprising:
verifying the one or more items of sensed biological data the one or more items of sensor-related information received from the one or more sensor devices.

8. The method of claim 1, wherein the private storage component is associated with the given user.

9. The method of claim 1, wherein the private storage component comprises a private cloud.

10. The method of claim 1, comprising:
controlling timing of (i) said receiving, (ii) said analyzing, and (iii) said transferring.

11. The method of claim 1, comprising:
implementing one or more analytics to identify the onset of a failure of the one or more sensor devices.

12. The method of claim 1, comprising:
implementing at least two sensing methods in connection with the one or more sensor devices for measuring a common analyte from a common fluid to identify a sensor-related error.

13. The method of claim 1, comprising:
implementing a common reference electrode for each respective one of the one or more sensor devices in a single cavity.

14. A computer program product, the computer program product comprising a non-transitory computer readable storage medium having program instructions embodied therewith, the program instructions executable by a computing device to cause the computing device to:

activate one or more sensor devices according to a timed schedule;

receive one or more items of sensed biological data and one or more items of sensor-related information from the one or more sensor devices via a communication link established with the one or more sensor devices, wherein the one or more sensor devices are associated with a given user, wherein the communication link established with the one or more sensor devices comprises one of a wireless network communication link and a wired network communication link, and wherein the one or more items of sensor-related information comprise (i) a time-stamp attributed to each of the items of sensed biological data, (ii) a sensor location identifier attributed to each of the items of sensed biological data, and (iii) a temperature value measured in conjunction with each of the items of sensed biological data;

create a security mechanism linking the one or more sensor devices with a private storage component associated with the given user, wherein the security mechanism is based on the one or more items of sensor-related information;

analyze the one or more items of sensed biological data to perform one or more characterization functions pertaining to the one or more items of biological data and the given user; and transfer, upon compliance with the security mechanism, the one or more items of sensed biological data and a result of the one or more characterization functions to a private storage component via a communication link established with the private storage component, wherein the communication link established with the private storage component comprises one of a wireless network communication link and a wired network communication link, and wherein said transferring comprises implementing one or more security functions in conjunction with said transferring.

15. A device comprising:
a memory; and
at least one processor coupled to the memory and configured for:
activating one or more sensor devices according to a timed schedule;
receiving one or more items of sensed biological data and one or more items of sensor-related information from the one or more sensor devices via a communication link established with the one or more sensor devices, wherein the one or more sensor devices are associated with a given user, wherein the communication link established with the one or more sensor devices comprises one of a wireless network communication link and a wired network communication link, and wherein the one or more items of sensor-related information comprise (i) a time-stamp attributed to each of the items of sensed biological data, (ii) a sensor location identifier attributed to each of the items of sensed biological data, and (iii) a temperature value measured in conjunction with each of the items of sensed biological data;
creating a security mechanism linking the one or more sensor devices with a private storage component associated with the given user, wherein the security mechanism is based on the one or more items of sensor-related information;

analyzing the one or more items of sensed biological data to perform one or more characterization functions pertaining to the one or more items of biological data and the given user; and transferring, upon compliance with the security mechanism, the one or more items of sensed biological data and a result of the one or more characterization functions to a private storage component via a communication link established with the private storage component, wherein the communication link established with the private storage component comprises one of a wireless network communication link and a wired network communication link, and wherein said transferring comprises implementing one or more security functions in conjunction with said transferring.

16. A system comprising:

one or more sensor devices comprising at least (i) a processor, (ii) a memory, (iii) a sensing mechanism, (iv) an energy source, (v) a communication mechanism, (vi) a security mechanism linking the one or more sensor devices with a private storage component associated with a given user, wherein the security mechanism is based on one or more items of sensor-related information associated with the given user, wherein the one or more items of sensor-related information comprise (i) a time-stamp attributed to each of the items of sensed biological data, (ii) a sensor location identifier attributed to each of the items of sensed biological data, and (iii) a temperature value measured in conjunction with each of the items of sensed biological data;

an integration device comprising at least (i) a processor (ii) a memory, and (iii) a communication mechanism; and the private storage component;

wherein the one or more sensor devices (i) capture, in accordance with one or more instructions provided by the integration device, one or more items of biological data and the one or more items of sensor-related information associated with the given user and (ii) transfer, upon compliance with the security mechanism, said one or more items of biological data and said one or more items of sensor-related information to the integration device via a link established between the communication mechanism of the one or more sensor devices and the communication mechanism of the integration device, wherein the link comprises one of a wireless network communication link and a wired network communication link; and wherein the integration device (i) analyzes the one or more items of biological data and the one or more items of sensor-related information via the processor of the integration device and (ii) transfers the one or more items of biological data to the private storage component via the communication mechanism of the integration device.

* * * * *